(No Model.)

J. LINES.
CURTAIN RING.

No. 443,288. Patented Dec. 23, 1890.

Witnesses
J. H. Shumway
Fred C. Earle

John Lines, Inventor
By Atty.

UNITED STATES PATENT OFFICE.

JOHN LINES, OF WATERBURY, CONNECTICUT, ASSIGNOR TO THE SCOVILL MANUFACTURING COMPANY, OF SAME PLACE.

CURTAIN-RING.

SPECIFICATION forming part of Letters Patent No. 443,288, dated December 23, 1890.

Application filed September 2, 1889. Serial No. 322,766. (No model.)

*To all whom it may concern:*

Be it known that I, JOHN LINES, of Waterbury, in the county of New Haven and State of Connecticut, have invented new Improvements in Curtain-Rings; and I do hereby declare the following, when taken in connection with accompanying drawings and the letters of reference marked thereon, to be a full, clear, and exact description of the same, and which said drawings constitute part of this specification, and represent, in—

Figure 1:
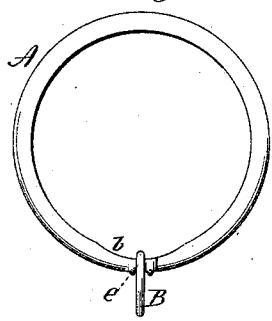
Figure 2:
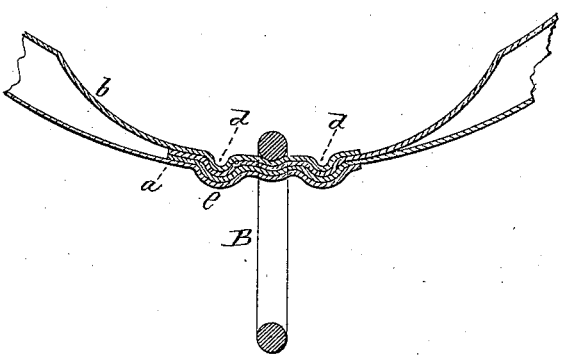
Figure 3:
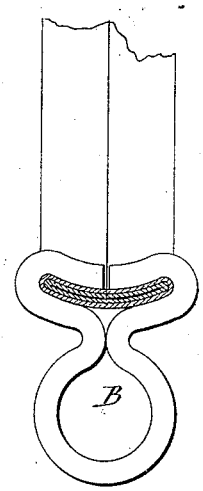
Figure 4:
Figure 5:
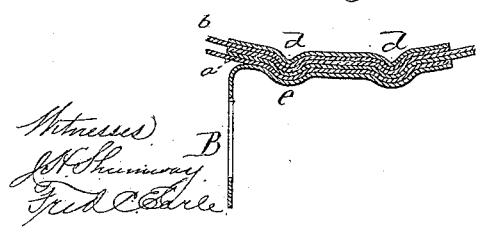
Figure 6:
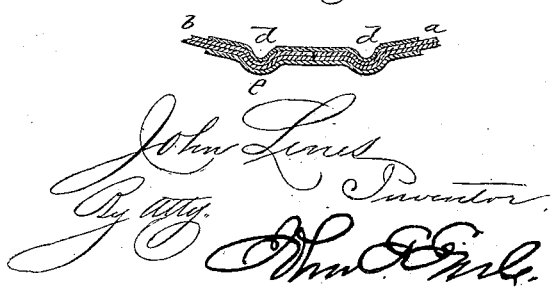

Figure 1, a side view of the ring complete; Fig. 2, an enlarged section in the plane of the ring, showing the joint; Fig. 3, a transverse section through the ring, showing the suspending loop; Fig. 4, a longitudinal section showing the ends of the ring as set the one within the other; Fig. 5, a modification representing the loop as attached to a sleeve surrounding the joint of the ring; Fig. 6, a modification in the corrugated joint.

This invention relates to an improvement in that class of rings which are employed on poles for the support of curtains and drapery. These rings as more generally constructed are made from a strip of sheet metal rolled into tubular shape, the edges of the strip meeting upon the inner side, and then the tube so formed bent into circular shape, the two ends united. Various devices have been employed for uniting these ends. In some cases the ends have been overlapped, and such overlapping ends pierced with a clip or loop introduced through the piercing both as a means for securing the ends together and as a support for the drapery. In other cases the two ends have been inclosed by a sleeve surrounding the two ends, and to which sleeve the suspending loop was attached or made a part of.

The object of my invention is to secure the ends of the ring together independent of the loop, and so that the ends of the ring are as substantially firmly united as if the ring were an endless one; and it consists in a ring made from a tube, the two ends set the one within the other, and the overlapping portions closed and transversely corrugated, so as to interlock one end with the other, and as more fully hereinafter described.

A represents the ring, which is made tubular, and such tube may be made from a strip of metal, the edges brought together upon the inside of the ring, as in the usual construction; or it may be a drawn tube.

In the formation of the ring the tube is of somewhat greater length than required for the ring, and being bent into ring shape one end $a$ of the ring is inserted into the other end $b$ of the ring, as seen in Fig. 4, and so that one end overlaps and surrounds the other. These overlapping portions are then closed together, preferably from the inside, as seen in Fig. 2, and in so closing, or after it is so closed, one or more transverse corrugations $d$, preferably two, are formed, and preferably from the inside outward, as represented in Fig. 2. These corrugations produce depressions upon the inside and corresponding ribs $e$ upon the ouside. (See Figs. 1 and 2.) The overlapping ends thus closed and transversely corrugated are consequently interlocked, so as to prevent their separation without substantially destroying the ring.

The closing and corrugating of the ends of the ring are produced by suitable machinery, which is extremely simple and cheap, and the ring when complete is substantially as strong as if the ring were endless or the ends soldered together. By closing the ring from the inside the outer shape of the ring throughout the joint may be preserved, except as to the corrugations.

A loop B is applied to the ring, by which to suspend the drapery. This loop is best made from wire, as seen in Fig. 3, its ends closed around the ring between the corrugations, the corrugations serving to retain the loop in its proper position on the ring. The depression which is formed in closing the ends together makes a recess within which the overlapping ends of the loop may rest, and so as to practically occupy no space within the inner circumference of the ring. The loop, however, may be applied in any desirable manner, that constituting no essential part of the present invention.

In some cases it is desirable that the suspending loop should be attached to or made as a part of a sleeve, closed around the ring at the joint, as seen in Fig. 5. In such case the sleeve is applied before the corrugations are formed, and then struck or pressed to produce the corrugations, as seen in Fig. 5, thus uniting the sleeve with the ring, the sleeve adding somewhat to the strength of the joint.

In the case of employing a sleeve such as above described the two ends of the ring proper may simply abut together, as represented in Fig. 6, the sleeve overlapping the two. One corrugation may be made through the sleeve into one end, and another corrugation through the sleeve into the other end, and thus firmly unite the ends of the ring. This construction, however, is substantially the same as that first described. The corrugation of the sleeve into one end makes an extension of that end of the ring into which the other end of the ring is set, and the corrugation formed therein unites the two ends of the ring substantially the same as if one end were inserted directly into the other end, as first represented, and I wish to be understood by the expression "the ends of the tube set the one within the other" as including an extension like the sleeve secured to one end and within which extension the other end enters.

I am aware that curtain-rings have been made from a divided tube, the two ends of the ring set the one within the other, and the two ends thus set together closed the one upon the other, is not new, such a construction being shown in patent granted to me June 4, 1889, No. 404,637, the essential feature of this invention being the transverse corrugations $d\ d$, whereby the closed ends are securely interlocked with each other.

I claim—

1. A curtain-ring made from a metal tube bent into ring shape, the ends of the tube set the one within the other, so that one end portion of the ring surrounds the corresponding portion of the other end, the two parts thus lying the one within the other, closed together, and having transverse corrugations $d$ in said closed portions, producing recesses upon the inside and corresponding depressions upon the outside of the ring, substantially as described.

2. A curtain-ring made from a metal tube bent into ring shape, the ends of the tube set the one within the other, the then overlapping ends struck close together and having two transverse corrugations formed therein, producing a pair of transverse ribs upon the outside of the closed portion of the ring, combined with a loop closed around the said ring between said corrugations, said corrugations serving as stops to locate the said loop on the ring, substantially as described.

JOHN LINES.

Witnesses:
M. L. SPERRY,
C. M. DE MOTT.